(12) United States Patent
Kybelund

(10) Patent No.: US 9,957,949 B2
(45) Date of Patent: May 1, 2018

(54) PERFORATED VACUUM MEMBRANE FOR FIBRE REINFORCED LAMINATES

(71) Applicant: Siemens Aktiengesellschaft, Munich (DE)

(72) Inventor: Peter Kybelund, Egtved (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 752 days.

(21) Appl. No.: 14/262,717

(22) Filed: Apr. 26, 2014

(65) Prior Publication Data
US 2014/0328690 A1    Nov. 6, 2014

(30) Foreign Application Priority Data
May 2, 2013  (EP) .................................... 13166234

(51) Int. Cl.
*F03D 1/06* (2006.01)
*B32B 3/26* (2006.01)
(Continued)

(52) U.S. Cl.
CPC .......... *F03D 1/0675* (2013.01); *B29C 70/086* (2013.01); *B29C 70/48* (2013.01); *B29C 70/547* (2013.01); *B32B 3/266* (2013.01); *B29C 70/021* (2013.01); *B29C 70/026* (2013.01); *B29C 70/443* (2013.01); *B29L 2031/085* (2013.01); *B32B 3/30* (2013.01); *B32B 5/02* (2013.01); *B32B 5/28* (2013.01); *B32B 27/02* (2013.01);
(Continued)

(58) Field of Classification Search
None
See application file for complete search history.

(56) References Cited

U.S. PATENT DOCUMENTS 3,399,822 A * 9/1968 Kugler ................... B65D 33/01
                                                          383/103
4,124,678 A * 11/1978 Stroupe ................... B29C 49/44
                                                          264/314
(Continued)

FOREIGN PATENT DOCUMENTS

CN    101077628 A    11/2007
CN    101394990 A    3/2009
(Continued)

OTHER PUBLICATIONS

CN Office Action dated May 2, 2017, for CN patent application No. 201410179696.9.

*Primary Examiner* — Jeffrey A Vonch
(74) *Attorney, Agent, or Firm* — Beusse Wolter Sanks & Maire

(57) ABSTRACT

A composite component for a wind turbine blade is provided. The composite component includes a stack of at least one fiber layer and a membrane which has a first surface and a second surface which is an opposite surface with respect to the first surface. The membrane is arranged with the first surface on top of the stack. The membrane is perforated with openings, wherein the membrane is formed in such a way that the openings are permeable for a fluid flowing along a first direction directing from the first surface to the second surface and impermeable for a fluid flowing along a second direction directing from the second surface to the first surface.

16 Claims, 2 Drawing Sheets

(51) Int. Cl.

| | |
|---|---|
| *B29C 70/08* | (2006.01) |
| *B29C 70/48* | (2006.01) |
| *B29C 70/54* | (2006.01) |
| B32B 27/04 | (2006.01) |
| B32B 27/12 | (2006.01) |
| B32B 5/02 | (2006.01) |
| B32B 5/28 | (2006.01) |
| B32B 27/02 | (2006.01) |
| B32B 3/30 | (2006.01) |
| B29C 70/02 | (2006.01) |
| B29C 70/44 | (2006.01) |
| B29L 31/08 | (2006.01) |

(52) U.S. Cl.

CPC ............ *B32B 27/04* (2013.01); *B32B 27/12* (2013.01); *B32B 2307/51* (2013.01); *B32B 2307/716* (2013.01); *B32B 2307/724* (2013.01); *B32B 2307/726* (2013.01); *B32B 2307/7242* (2013.01); *B32B 2307/7265* (2013.01); *B32B 2603/00* (2013.01); *Y02E 10/721* (2013.01); *Y10T 29/49337* (2015.01); *Y10T 428/24298* (2015.01); *Y10T 428/24314* (2015.01); *Y10T 428/24322* (2015.01); *Y10T 428/24612* (2015.01); *Y10T 428/24995* (2015.04); *Y10T 428/249924* (2015.04); *Y10T 428/249941* (2015.04)

(56) References Cited

U.S. PATENT DOCUMENTS

| | | | | |
|---|---|---|---|---|
| 4,132,755 | A * | 1/1979 | Johnson | B29C 70/443 264/102 |
| 4,902,215 | A * | 2/1990 | Seemann, III | B29C 43/56 425/406 |
| 4,942,013 | A * | 7/1990 | Palmer | B29C 43/3642 156/285 |
| 5,052,906 | A * | 10/1991 | Seemann | B29C 43/203 264/258 |
| 5,108,532 | A * | 4/1992 | Thein | B29C 43/203 156/285 |
| 5,181,287 | A * | 1/1993 | Jun-Jie | A41D 31/0033 236/93 R |
| 5,439,635 | A * | 8/1995 | Seemann | B29C 33/0066 264/154 |
| 5,620,771 | A * | 4/1997 | Middleton | A41D 31/02 428/131 |
| 5,787,502 | A * | 8/1998 | Middleton | A41D 31/0038 2/2.15 |
| 6,048,488 | A * | 4/2000 | Fink | B29C 70/08 264/102 |
| 6,508,974 | B1 * | 1/2003 | Loving | B29C 70/443 264/510 |
| 6,818,159 | B2 | 11/2004 | Hinz | |
| 2003/0025231 | A1 * | 2/2003 | Slaughter | B29C 43/003 264/102 |
| 2003/0025232 | A1 * | 2/2003 | Slaughter | B29C 70/443 264/102 |
| 2003/0077965 | A1 * | 4/2003 | Mack | B29C 70/24 442/180 |
| 2003/0211194 | A1 * | 11/2003 | Louderback | B29C 70/443 425/389 |
| 2004/0017020 | A1 * | 1/2004 | Loving | B29C 70/443 264/134 |
| 2004/0144744 | A1 * | 7/2004 | Holley, Jr. | A61J 11/009 215/11.1 |
| 2004/0192137 | A1 * | 9/2004 | Starkey | B29C 70/086 442/286 |
| 2005/0003150 | A1 * | 1/2005 | Lin | B32B 3/266 428/131 |
| 2005/0040553 | A1 * | 2/2005 | Slaughter | B29C 70/443 264/40.1 |
| 2005/0281980 | A1 * | 12/2005 | Cruz | B29C 70/44 428/131 |
| 2006/0062950 | A1 * | 3/2006 | Catella | B29C 70/44 428/35.2 |
| 2006/0125155 | A1 * | 6/2006 | Sekido | B29C 70/443 264/511 |
| 2007/0274835 | A1 * | 11/2007 | Stiesdal | B29C 70/443 416/230 |
| 2008/0093761 | A1 * | 4/2008 | Hansen | B29C 70/443 264/46.6 |
| 2008/0277053 | A1 * | 11/2008 | Stiesdal | B29C 70/342 156/245 |
| 2008/0305701 | A1 * | 12/2008 | Guigner | B29B 11/16 442/63 |
| 2009/0051076 | A1 * | 2/2009 | Kofoed | B29C 70/443 264/258 |
| 2009/0082746 | A1 * | 3/2009 | Thomas | A61F 13/512 604/378 |
| 2009/0284052 | A1 * | 11/2009 | Bajic | A47C 7/72 297/180.1 |
| 2010/0086765 | A1 * | 4/2010 | Inston | B29C 70/086 428/311.51 |
| 2010/0228001 | A1 * | 9/2010 | Mortimer | B29C 70/086 528/322 |
| 2011/0049770 | A1 * | 3/2011 | Stiesdal | B29C 70/443 264/511 |
| 2011/0180960 | A1 * | 7/2011 | Blot | B29C 70/443 264/257 |
| 2012/0119422 | A1 * | 5/2012 | Lockett | B29C 70/443 264/554 |
| 2012/0126060 | A1 * | 5/2012 | Blot | B29C 70/443 244/119 |
| 2013/0126386 | A1 * | 5/2013 | Dull | B29C 70/44 206/524.8 |
| 2013/0264751 | A1 * | 10/2013 | Lockett | B29C 70/021 264/571 |
| 2014/0361468 | A1 * | 12/2014 | Grove-Nielsen | B29C 70/443 264/571 |

FOREIGN PATENT DOCUMENTS

| | | | | |
|---|---|---|---|---|
| DE | 10013409 | C1 | 11/2000 | |
| DE | 10105976 | A1 * | 8/2002 | ......... B29C 33/0061 |
| EP | 2123431 | A1 | 11/2009 | |
| EP | 2604413 | A1 | 6/2013 | |
| FR | 2828131 | A1 * | 2/2003 | ............ B29C 70/48 |
| FR | 2868008 | A1 * | 9/2005 | ............ B29C 70/44 |
| GB | 2360483 | A * | 9/2001 | .......... B29C 70/086 |
| GB | 2360483 | A | 9/2001 | |
| WO | WO-02058915 | A1 * | 8/2002 | .......... B29C 70/086 |
| WO | WO 2007038930 | A1 * | 4/2007 | .......... B29C 70/342 |
| WO | 2007098769 | A1 | 9/2007 | |

\* cited by examiner

PERFORATED VACUUM MEMBRANE FOR FIBRE REINFORCED LAMINATES

CROSS REFERENCE TO RELATED APPLICATIONS

This application claims priority to and the benefit of European Application No. EP13166234 filed May 2, 2013, incorporated by reference herein in its entirety.

FIELD OF INVENTION

The present invention relates to a composite component for a wind turbine blade and to a method for manufacturing a composite component for a wind turbine blade.

ART BACKGROUND

For wind turbines, in particular for wind turbine blades, stable and lightweight material is used. Specifically composite fibre components are used for the wind turbine blades due to the proper material characteristics.

Hence, the composite component made for example for the wind turbine blades comprises several reinforced fibre layers which form a stack. The composite component is often made by using a transfer moulding process. By using the transfer moulding process, the reinforced fibre layers are stacked above each other inside a mould. The mould defines a desired shape of the fibre components to be manufactured. After arranging the composite layers into the mould, from the opposed side of the mould a further mould, such as an inflatable bag, a vacuum membrane or a stiff mould, is attached. The stack is then pressed between the mould and the further mould. In a subsequent step, the stack and the single reinforced fibre layers are wetted and soaked with resin. Next, the soaked reinforced fibre layers of the stack are cured by a predefined temperature.

During manufacturing of the composite component, it has to be ensured that the single reinforced fibre layers are arranged in a correct position and thus form a geometrical conformity during the whole manufacturing process. In particular, the reinforced fibre layers have to be already fixed before the reinforced fibre layers are pressed and thus fixed between the respective moulds. Therefore, an underpressure or a vacuum is applied in order to soak the stack of reinforced fibre layers to one of the moulds. Thereby, the reinforced fibre layers are fixed to the respective mould.

In order to improve the vacuum fixing of the stack to the mould, a dense fibre material layer can be placed on a surface of the stack of composite layers. The dense fibre material layer has a low permeability to air in order to establish an underpressure between the mould surface and the sealed fibre material layer in order to fix the stack which is located between the sealed fibre material layer and the mould to the mould surface. Thus, the fibre material layup can be fixated, and thereby enable further movement without the risk of displacing the fibre layup.

EP 2 123 431 B1 discloses to apply a vacuum distribution layer at an inner surface of the mould. The vacuum distribution layer is connected to a vacuum pump such that the vacuum pump may suck the air through the vacuum distributing layer out of the stack.

On the one hand, it is desired that the top fibre layer of the stack, which layer forms a part of the structure reinforcement of the laminate, is of a conventional type and comprises a good resin wetting property and a good interlaminate shear strength relative to any adjacent structure elements such as shells, beams, etc. On the other hand, it is desired that the top fibre layer has a low permeability such that good vacuum properties are provided. In tendency, this top fibre layer with a low permeability to air generally comprises a relatively poor resin wetting property and a low interlaminate shear strength which would be normally desirable.

Furthermore, even with the relative low air permeability of the top fibre layer, an extremely large air flow is necessary to retain a sufficient pressure difference over the fibre layup for holding the stack to the mould surface, especially when moulding large parts like above described wind turbine blades.

Therefore, fixating the fibre layup with other means than a dense fibre surface material can be advantageous.

SUMMARY OF INVENTION

It may be an object of the present invention to provide a composite component for a wind turbine blade which is simple to manufacture.

This object may be solved by a composite component by a wind turbine blade and by a method for manufacturing a composite component for a wind turbine blade according to the independent claims.

According to a first aspect of the present invention a composite component for a wind turbine is presented. The composite component comprises a stack of at least one (reinforced) fibre layer and a membrane. The membrane has a first surface and a second surface which is an opposite surface with respect to the first surface. The membrane is arranged with the first surface on top of the stack.

The membrane is perforated with openings, wherein the membrane is formed in such a way that the openings are permeable for a fluid flowing along a first direction directing from the first surface to the second surface and which openings are impermeable or less permeable for a fluid flowing along a second direction directing from the second surface to the first surface.

According to a further aspect of the present invention a method for manufacturing a composite component for a wind turbine blade is presented. According to the method, a membrane is arranged with the first surface on top of the stack of at least one (reinforced) fibre layer. The membrane is perforated with openings which are formed in such a way that the openings are permeable for a fluid flowing along a first direction directing from the first surface to a second surface which is an opposite surface with respect to the first surface. Furthermore, the openings are formed in such a way that the openings are impermeable or less permeable for a fluid flowing along a second direction directing from the second surface to the first surface.

The stack comprises at least one fibre layer. The fibre layer may be made of fibres which are unidirectional or multidirectional aligned with respect to each other. The fibres of a layer may also form a woven fabric and a prepreg, for example. Each fibre layer of the stack may be made of different materials and may comprise different material characteristics. For example, the fibre may be made of carbon fibres, glass fibres or other reinforced fibres. Furthermore, the stack may comprise a core layer which comprises a core material which may be for example a balsa wood material.

The fluid may be a gaseous or a liquid fluid, such as air or resin, for example. In particular, the fluid which flows along the first direction through the openings may be resin, whereas the fluid flowing along the second direction may be air, for example.

The resin may be for example, but not limited to, unsaturated polyester or epoxy. The resin may comprise for example components of styrene, acrylate, methacrylate or a diluent, for example.

The membrane may be made of a synthetic plastic material, such as polystyrene or the like. The permeability of the membrane is provided by a perforation of the membrane with openings. The openings are formed in such a way, that a fluid flowing along a first direction directing from the first surface to the second surface may flow through the membrane. Furthermore, the openings are formed in such a way that a fluid which flows along a second direction is prevented from flowing through the openings.

Hence, the membrane combines the desired effects that on the one side the resin as a first fluid may flow through the membrane and on the other side air as a second fluid is blocked or hindered from flowing through the membrane in a second direction. Hence, a proper resin distribution is formed and simultaneously a good fixation of the composite component onto a mould by applying underpressure is achieved.

By arranging the membrane on top of the stack which is arranged onto a surface of the mould, a (almost) closed barrier to air for a vacuum consolidation of the stack is achieved. Hence, between the membrane and the mould surface an underpressure may be generated efficiently by arranging the membrane in such a way that the stack and the membrane are fixed by the underpressure to the membrane until the dry stack and the dry membrane are fixed to the mould by a counterpart of a further mould in order to prevent a misalignment of the fibre layers of the stack and the membrane.

However, if the mould and the stack and the membrane fixed thereon by underpressure are moved in a final position, resin is injected in order to soak the stack and the membrane with the resin. The resin may be pressed through the stack and the membrane along the first direction such that the membrane is permeable and the resin is flowable through the stacks and the membrane such that comprehensive supply of the resin to all desired layers and the membrane is ensured.

In other words, the membrane is impermeable when a fluid flows along a second direction and is permeable when a fluid flows along the first direction and thereby allowing flow through the membrane in a resin soaking process step. Hence, by the present invention a composite component, in particular for a wind turbine blade, is provided, wherein the composite component comprises a membrane which may form finally an integrated surface layer of the composite component, wherein the membrane has a sufficiently low permeability to ensure a vacuum and underpressure consolidation during manufacturing and handling before wetting and soaking of the stack by resin and which can form a part of and be integrated with the complete finished composite component.

In other words, by using the above described membrane which is permeable depending on the first and the second direction a manufacturing process is enabled where adjoining two or more fibre layers may be positioned under a vacuum while still allowing a resin flow.

According to a further exemplary embodiment, the composite component further comprises a further stack with at least one further fibre layer arranged on the second surface of the membrane. Hence, the membrane may be an intermediate layer between the stack and the further stack. Thereby, in a first manufacturing step, the membrane may fix the stack to the mould while applying an underpressure. Next, the further stack may be applied to the second surface of the membrane. In a subsequent step, resin may be injected through the stack (along the first direction) further through the membrane and further to the further stack. Hence, a proper wetting of the further stack with resin in one manufacturing process step is possible.

According to a further exemplary embodiment, the membrane comprises a degradable material. Although the membrane may be a part of the finished composite component, it may alternatively be possible to apply the membrane with a degradable material, so that after the applying of underpressure and after wetting and soaking the fibre layers with resin, the membrane is degraded in a subsequent method step. For example, after the stack and/or the further stack is soaked with resin, the membrane may be degraded by initiating a decomposing agent, such as styrene, acrylate, methacrylate etc. and/or by heating the degradable membrane to a temperature above a predetermined (e.g. melting) temperature. Furthermore, the membrane may be exposed to a predefined degrading light, such as infrared light etc.

According to a further exemplary embodiment, the membrane comprises an elastic seal lip surrounding the at least one of the openings at the second surface. According to a further exemplary embodiment, the respective elastic seal lip is formed such that the respective seal lip closes the respective opening if a second pressure of the fluid applied at the first surface is lower than a first pressure of the fluid applied at the second surface and the respective seal lip open the respective opening if a second pressure of the fluid applied at the first surface is higher than the first pressure of the fluid applied at the second surface.

Hence, by applying elastic seal lips around in particular an edge of the respective openings at the second surface, the lips may be elastically deformable by the fluid (pressure) acting thereon, such that fluid may flow through or not flow through the openings.

According to a further exemplary embodiment, at least one of the openings has a cone-like shape with a base area and a cone end, wherein the base area is formed at the first surface and the cone area is formed at the second surface. The respective seal lip is formed at the cone area.

Hence, by providing a cone-like shape of the openings, the fluid which is pressed along the first direction enters the openings through the larger base area. When moving further from the base area along the first direction to the cone ends, the fluid inside the openings is concentrated at the seal lips due to the decreasing diameter. Hence, the seal lips opens such that the fluid can flow through the open openings. If the fluid is pressed along the second direction, the fluid is pressed against the seal lip, wherein the seal lip is not bendable inside the opening, such that the opening stays closed.

In the following, the manufacturing method for manufacturing the composite component with the above described membrane is described in more detail:

The stack and the membrane are first of all arranged onto a mould surface of a mould. The mould surface forms a negative form of the composite component (e.g. a wind turbine blade) to be finally manufactured. The stack comprising at least one fibre layer is arranged onto the surface of the mould. Above the stack, the membrane is arranged.

Next, an underpressure between the membrane and the mould is applied, e.g. by a vacuum pump, such that the membrane and the stack are pressed against the surface of the mould, so that the membrane and the stack are fixed to the surface of the mould. The membrane is orientated in such a way, that if the underpressure is applied, no or very little air is flowable along the second direction through the opening such that the membrane is almost impermeable for air when applying underpressure between the membrane and the mould surface.

Next, the mould may be moved to a desired position. During a movement of the mould, a misalignment of the stack and the membrane is prevented due to the fixation to the surface of the mould by the applied underpressure.

Additionally, a further stack of at least one further fibre layer may be arranged onto a second surface of the membrane.

Next, a further mould, such as a mould core and optionally an inflatable bag, is applied such that the stack, the membrane and optionally the further stack are located between the further mould and the mould. Hence, the stack, the further stack and the membrane are clamped between the further mould and the mould, so that a misalignment of the stack, the further stack and the membrane is prevented.

In the next step, resin is injected via a pressure difference through the at least one fibre layer of the stack, the membrane and optionally through the further stack along the first direction. Hence, during the injection of the resin along the first direction, the membrane is permeable, so that a resin flow is provided through the stack, the membrane and optionally the further stack. Hence, all elements of the composite components between the mould and the further mould are homogeneously soaked with resin, because the membrane does not function as a barrier for the resin.

Optionally, the membrane may be degraded after or before the resin is injected. The membrane may be degraded by a physical (e.g. light, heating) or a chemical (such as predefined solvent dilution) degradation of the membrane.

Finally, the composite component is cured under a predefined temperature and the mould is removable from the finished composite component.

The above described composite component may form a complete or a part of a wind turbine component, such as a wind turbine blade.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
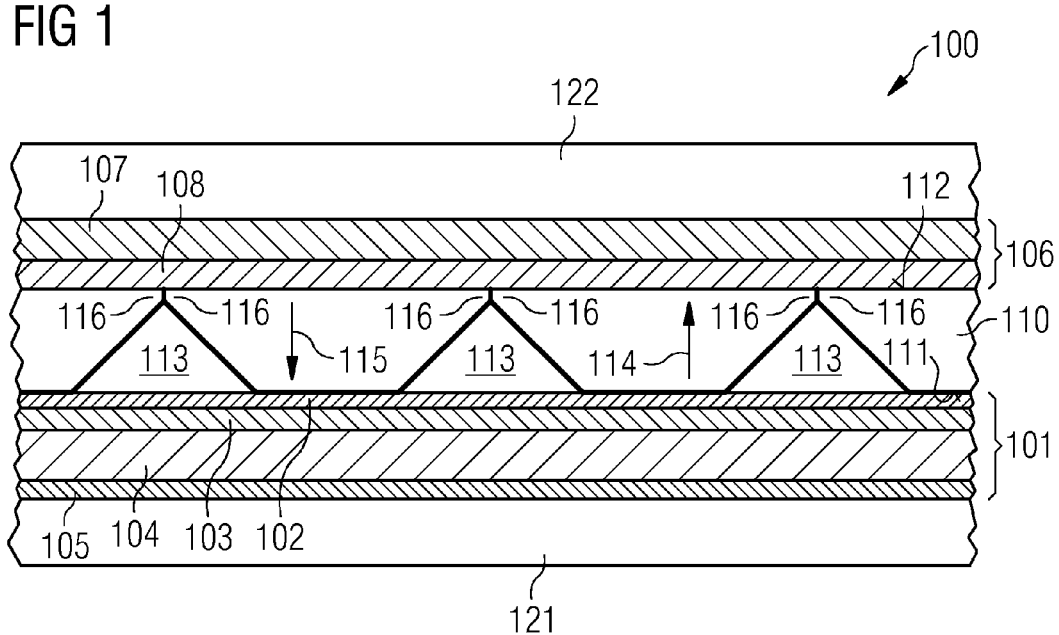
FIG. 1 shows a schematical view of a layer structure of a composite component between two moulds according to an exemplary embodiment of the present invention.

The illustrations in the drawings are schematical. It is noted that in different figures, similar or identical elements are provided with the same reference signs.

FIG. 1 shows a composite component 100 for a wind turbine blade, wherein the composite material 100 comprises a stack 101, a membrane 110 and optionally a further stack 106. The stack 101 comprises at least one fibre layer 102, 103, 105. Furthermore, the stack may comprise optionally a core material 104 which may be interposed between the respective fibre layers 103, 105.

Figure 2:
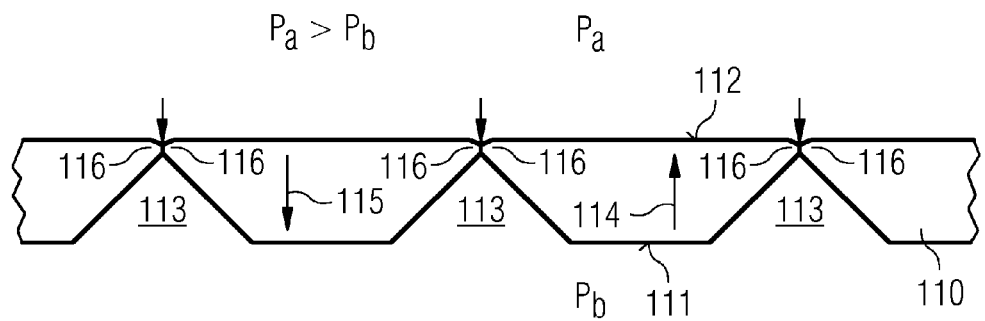
FIG. 2 shows schematically a membrane in an impermeable state according to an exemplary embodiment of the present invention.
Figure 3:
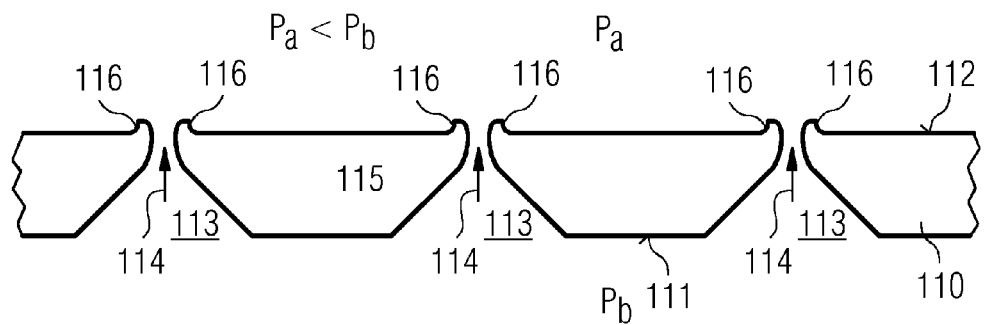
FIG. 3 shows a schematical view of a membrane in a permeable state according to an exemplary embodiment of the present invention.

In FIG. 1 to FIG. 3, in particular the membrane 110 is shown schematically with a large thickness in order to outline the perforation with openings 113. However, the membrane 110 may comprise the thickness of the fibre layer 102, 103, 105 or may comprise a smaller thickness than the fibre layer 102, 103, 105.

The membrane 110 has a first surface 111 and a second surface 112 which is an opposite surface with respect to the first surface 111. The membrane 110 is arranged with the first surface 110 on top of the stack 101.

The membrane 110 is perforated with openings 113 which are formed in such a way that the openings 113 are permeable for fluid (such as resin) flowing along a first direction 114 directing from the first surface 111 to the second surface 112 and which openings 113 are impermeable for a fluid (such as air) flowing along a second direction 115 directing from the second surface 112 to the first surface 111.

A further stack 106 is optionally arranged on the second surface 112 of the membrane 110. The further stack 106 may comprise further fibre layers 107, 108.

As can be taken from FIG. 1, the stack 101 which may comprise the fibre layers 102, 103, 105 and for example a core material 104 may be arranged onto a surface of the mould 121. The stack 101 is covered by the membrane 110. At this step, the fibre layers 102, 103, 105, 107, 108 and the membrane 110 are dry and also movable with respect to each other. In order to prevent an undesired relative movement e.g. between the stack 101 and the membrane 110, an underpressure is applied between the membrane 110 and the mould 121 for pressing and thus fixing the membrane 110 and the stack 101 to the mould 121.

In order to support the generation of the underpressure between the membrane 110 and the mould 121, the membrane 110 is aligned in such a way that fluid (such as air) is not flowable along the second direction 115 from the surroundings of the membrane 110 to the inner surface of the mould 121. Hence, the membrane 110 functions as a barrier layer for the fluid (air) and is almost airtight. Hence, a proper and temporary fixation of the membrane 110 and the stack 101 onto the mould 121 is achieved.

After positioning the mould 121 at the desired location and/or after locating a further mould 121 onto the membrane 110 or onto the further stack 106, the composite component 100 is fixed between the mould 121 and the further mould 122. If the stack 101, the further stack 106 and the membrane 110 are clamped and thus fixed between the mould 121 and the further mould 122, a transfer moulding procedure may be started. Hence, a fluid, such as a resin, is injected between the mould 121 and the further mould 122. In particular, the resin is injected starting from the mould 121 along the first direction 114 through the stack 101. Because the openings 113 are permeable for the resin flowing along the first direction 114, the resin may flow through the openings 113 such that the fibre layers 102, 103, 105, the membrane 110 itself and optionally the further fibre layers 107, 108 are homogeneously soaked and wetted with the resin. Hence, the membrane 110 does not function as a barrier layer for the fluid (resin) flowing along the first direction 114.

After the stack 101, the membrane 110 and optionally the further stack 106 is soaked sufficiently with resin, the composite component 100 may be cured by applying curing temperature (if necessary) to the composite material 100.

The membrane 110 may comprise elastic seal lips 116 surrounding the openings 113 at the second surface 112. If a fluid flows along the second direction 115, the seal lip 116 surrounding an opening 113 is pressed together such that the opening 113 is impermeable for the fluid. If the fluid flows along the first direction 114, the seal lip 116 is elastically deformed and edges of the seal lip 116 are bent away, such that the fluid is flowable through the openings 113 along the first direction 114.

FIG. 2 shows a detailed view of the membrane 110, wherein the openings 113 are closed by the seal lips 116 and thus impermeable for the fluid flowing along the second direction 115. As can be taken from FIG. 2, the fluid flows along the second direction 115, if a first pressure Pa acting on the second surface 112 of the membrane 110 is higher than the second pressure Pb acting on the first surface 111 of the membrane 110. This situation is generated for example when applying the vacuum pump for sucking air out of a region between the membrane 100 and the mould 121.

The openings 113 are formed with a cone-like shape. In FIG. 2, a cross-sectional view of the membrane 100 and the openings 113 is shown. The cone-like shaped openings 113 have a larger base area and a smaller cone end. The base area is formed at the first surface 111 and the cone area is formed at the second surface 112. Respective seal lips 116 surrounding a respective opening 113 are formed at the cone area.

In FIG. 3, the membrane 110 is shown in a permeable state. The openings 113 are opened because the edges of the seal lips 116 are bended away by the fluid acting on the seal lip 116. Hence, the seal lips 116 are permeable for the fluid flowing along the first direction 114. As can be taken from FIG. 3, the fluid flows along the first direction 114, if the first pressure Pa acting on the second surface 112 of the membrane 110 is lower than the second pressure Pb acting on the first surface 111 of the membrane 110. This situation is generated for example when pressing the resin for soaking and wetting the stack 101 into a region between the membrane 100 and the mould 121.

Summarizing, the membrane 110 is placable on top of the stack 101 for forming a closed barrier to air for providing a vacuum consolidation of the complete stack 101. On the other side, the membrane 110 is permeable in order to ensure a proper soaking of the stack 101, the membrane 110 and the further stack 106. The membrane 110 may be made partially heterogeneous over the thickness in order to be able to react differently depending on pressure differences between the first surface 111 and the second surface 112. This is obtained by introducing valve-like, cone-shaped openings 113. When exposed to a positive pressure difference from Pa to Pb (Pa≥Pb as shown in FIG. 2) the membrane is closed and (almost) vacuum tight. However, when a negative pressure difference occurs (Pa≤Pb, FIG. 3) e.g. during resin injection, the membrane 110 opens up and a flow of fluid (resin) through the openings 113 is possible. Hence, resin is provided at the stacks 101, 106 where resin is needed.

The membrane 110 may form an integrated part of the final structure of the composite component. The membrane 110 may form a surface layer of the composite component 100, because the membrane 110 may be sufficiently wetted and soaked with resin by the permeability properties of the membrane 110.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A composite component for a wind turbine blade, wherein the composite component is configured to form at least part of the wind turbine blade, the composite component comprising:
    a stack of at least one fibre layer, and
    a membrane which has a first surface and a second surface which is an opposite surface with respect to the first surface,
    wherein the membrane is arranged with the first surface on top of the stack,
    wherein the membrane is perforated with openings,
    wherein the membrane is formed such that the openings are
        permeable for a fluid flowing along a first direction directed from the first surface to the second surface, and
        impermeable for a fluid flowing along a second direction directed from the second surface to the first surface
    wherein the membrane comprises at least one elastic seal lip surrounding one of the openings at the second surface
    wherein the elastic seal lip is formed such that
        the seal lip is pressed together to close the respective opening if a second pressure (Pb) of the fluid applied at the first surface is lower than a first pressure (Pa) of the fluid applied at the second surface, and
        the seal lip is elastically deformed and edges of the seal lip are bent away from the respective opening to open the respective opening if the second pressure (Pb) of the fluid applied at the first surface is higher than the first pressure (Pa) of the fluid applied at the second surface.

2. The composite component according to claim 1, wherein the fluid flowing along the first direction is a first fluid and wherein the fluid flowing along the second direction is a second fluid different than the first fluid.

3. The composite component according to claim 2, wherein the first fluid is resin and the second fluid is air and wherein the at least one fibre layer of the stack is a plurality of fibre layers.

4. The composite component according to claim 1, further comprising
    a further stack with at least one further fibre layer arranged on the second surface of the membrane.

5. The composite component according to claim 1, wherein the membrane comprises a degradable material.

6. The composite component according to claim 1, wherein at least one of the openings has a cone-like shape with a base area and a cone end, wherein the base area is formed at the first surface and the cone area is formed at the second surface, wherein the seal lip is formed at the cone area.

7. A method for manufacturing the composite component of claim 1, wherein the composite component comprises the membrane and the stack of at least one fibre layer, the method comprising arranging the membrane with the first surface on top of the stack.

8. The method according to claim 7, further comprising:

pressing the elastic seal lip together based on the second pressure (Pb) of the fluid applied at the first surface being lower than the first pressure (Pa) of the fluid applied at the second surface; and closing the opening based on the pressing the elastic seal lip together such that the opening is impermeable to the fluid flowing along the second direction.

9. The method according to claim 7, further comprising:

deforming the elastic seal lip by bending the edges of the seal lip away from the respective opening based on the second pressure (Pb) of the fluid applied at the first surface being higher than the first pressure (Pa) of the fluid applied at the second surface; and opening the opening based on the deforming the elastic seal lip such that the opening is permeable to the fluid flowing along the first direction.

10. The method according to claim 7, further comprising arranging a further stack of at least one further fibre layer onto the second surface of the membrane.

11. The method according to claim 7, further comprising arranging the stack and the membrane into a mould, and applying an underpressure between the membrane and the mould such that the membrane and the stack are pressed against the mould.

12. The method according to claim 11, further comprising applying a further mould such that the stack and the membrane are located between the mould and the further mould.

13. The method according to claim 7, further comprising injecting resin through the at least one fibre layer of the stack and the membrane along the first direction.

14. The method according to claim 7, further comprising degrading the membrane by a physical and/or chemical degradation of the membrane.

15. A composite component for a wind turbine blade, wherein the composite component is configured to form at least part of the wind turbine blade, the composite component comprising a first stack of at least one fibre layer, a second stack of at least one fibre layer, a membrane which has a first surface and a second surface which is an opposite surface with respect to the first surface, wherein the membrane is arranged with the first surface on top of the first stack and with the second stack arranged on the second surface, wherein the membrane is perforated with openings, wherein the membrane is formed such that the openings are permeable for a fluid flowing along a first direction directed from the first surface to the second surface, and impermeable for a fluid flowing along a second direction directed from the second surface to the first surface;

wherein the membrane comprises an elastic seal lip surrounding one of the openings, wherein the elastic seal lip is pressed together based on a second pressure (Pb) of the fluid applied at the first surface being lower than a first pressure (Pa) of the fluid applied at the second surface such that the opening is impermeable for the fluid flowing along the second direction and wherein the elastic seal lip is elastically deformed and edges of the seal lip are bent away from the opening based on the second pressure (Pb) of the fluid applied at the first surface being greater than the first pressure (Pa) of the fluid applied at the second surface such that the opening is permeable for the fluid flowing along the first direction.

16. The composite component according to claim 15, wherein at least one of the openings has a cone-like shape with a base area and a cone end, wherein the base area is formed at the first surface and the cone area is formed at the second surface, wherein the seal lip is formed at the cone area.

* * * * *